United States Patent
Gopal et al.

(10) Patent No.: US 10,990,929 B2
(45) Date of Patent: Apr. 27, 2021

(54) SYSTEMS AND METHODS FOR GENERATING AND TRANSMITTING TARGETED DATA WITHIN AN ENTERPRISE

(71) Applicant: ServiceNow, Inc., Santa Clara, CA (US)

(72) Inventors: Harshitha Kota Ram Gopal, Sunnyvale, CA (US); Kenneth James Hamer, Ramona, CA (US); Lucinda Kathryn Foss, San Francisco, CA (US); Anil Kumar Bathula, Fremont, CA (US); Ismail Sencan, San Diego, CA (US); Harivijay Srikanth Gunuru, San Jose, CA (US); Regis Michel Cridlig, San Diego, CA (US); Akhilesh Kondra, San Jose, CA (US); Kaho Lee, San Jose, CA (US); Sarup Paul, Pleasanton, CA (US); Maria Svoisky Goldberg, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 160 days.

(21) Appl. No.: 15/971,628

(22) Filed: May 4, 2018

(65) Prior Publication Data

US 2019/0266284 A1     Aug. 29, 2019

Related U.S. Application Data

(60) Provisional application No. 62/635,756, filed on Feb. 27, 2018.

(51) Int. Cl.
*G06Q 10/10* (2012.01)
*G06F 16/16* (2019.01)
*G06F 16/951* (2019.01)
*G06N 5/02* (2006.01)

(52) U.S. Cl.
CPC ....... *G06Q 10/1057* (2013.01); *G06F 16/164* (2019.01); *G06F 16/951* (2019.01); *G06N 5/022* (2013.01)

(58) Field of Classification Search
CPC . G06F 16/164; G06F 16/951; G06Q 10/1057; G06N 5/022
See application file for complete search history.

(56) References Cited

U.S. PATENT DOCUMENTS

| | | |
|---|---|---|
| 6,609,122 B1 | 8/2003 | Ensor |
| 7,020,706 B2 | 3/2006 | Cates |
| 7,028,301 B2 | 4/2006 | Ding |
| 7,062,683 B2 | 6/2006 | Warpenburg |

(Continued)

*Primary Examiner* — Kannan Shanmugasundaram
(74) *Attorney, Agent, or Firm* — Fletcher Yoder PC

(57) ABSTRACT

The present approach relates to providing targeted content to a user (e.g., employee) of an enterprise. In certain implementations, the present techniques involve receiving filter data (e.g., data identifying an employee) from a user and providing content in the form of knowledge blocks to a user based on metadata of the knowledge blocks that is associated with the filter data. In other implementations, the present techniques involve receiving trigger data (e.g., data of an employee satisfying a condition) and providing a set of activities (e.g., social activities or work related) to a user based on the trigger data.

20 Claims, 17 Drawing Sheets

(56) References Cited

U.S. PATENT DOCUMENTS

| | | |
|---|---|---|
| 7,131,037 B1 | 10/2006 | LeFaive |
| 7,170,864 B2 | 1/2007 | Matharu |
| 7,350,209 B2 | 3/2008 | Shum |
| 7,496,840 B2 | 2/2009 | Hailey et al. |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,887,133 B2 | 11/2014 | Behnia |
| 9,065,783 B2 | 6/2015 | Ding |
| 9,081,939 B2 | 7/2015 | Snodgrass |
| 9,122,552 B2 | 9/2015 | Whitney |
| 9,239,857 B2 | 1/2016 | Trinon |
| 9,535,737 B2 | 1/2017 | Joy |
| 9,557,969 B2 | 1/2017 | Sharma |
| 9,727,845 B2 | 8/2017 | Cooper et al. |
| 9,792,387 B2 | 10/2017 | George |
| 2005/0060310 A1* | 3/2005 | Tong ................ G06F 16/951 707/999.007 |
| 2006/0206454 A1* | 9/2006 | Forstall ............. G06F 16/951 707/999.003 |
| 2006/0242138 A1* | 10/2006 | Brill ................. G06F 16/951 707/999.005 |
| 2009/0254572 A1* | 10/2009 | Redlich .............. G06Q 10/06 707/999.01 |
| 2013/0006999 A1* | 1/2013 | Wojtowicz ........ G06F 16/2471 707/741 |
| 2013/0124560 A1* | 5/2013 | O'Sullivan ........ G06F 16/951 707/769 |
| 2013/0332369 A1* | 12/2013 | Paramashivappa ................ G06Q 10/06311 705/301 |
| 2014/0052644 A1* | 2/2014 | Ott .................... G06Q 30/01 705/304 |
| 2015/0379140 A1* | 12/2015 | Shukla .............. G06F 16/9535 707/722 |

* cited by examiner

CONTENT TYPE: EVENTS

| UPCOMING EVENTS |
|---|
| HERE'S AN EVENT TITLE<br>DD /MM /YY<br>📅 ADD TO CALENDAR |
| HERE'S ANOTHER AWESOME EVENT TITLE<br>DD /MM /YY<br>📅 ADD TO CALENDER |
| THIS EVENT IS WAY BETTER THAN THE OTHERS<br>DD /MM /YY<br>📅 ADD TO CALENDER |

METRICS (PER EVENT)

TOTAL USERS: <N>

UNIQUE IMPRESSIONS: <N>

EXPAND RATE: <N>

UNIQUE CLICKTHROUGH: <N>

TOTAL CLICKTHROUGH: <N>

TOTAL DOWNLOAD CLICKTHROUGH: <N>

VIEWS

TOTAL

DAY

WEEK

MONTH

FIG. 13B

SYSTEMS AND METHODS FOR GENERATING AND TRANSMITTING TARGETED DATA WITHIN AN ENTERPRISE

CROSS REFERENCE TO RELATED APPLICATION

This application claims priority to and benefit of U.S. Provisional Patent Application No. 62/635,756, entitled "SYSTEMS AND METHODS FOR GENERATING AND TRANSMITTING TARGETED DATA WITHIN AN ENTERPRISE", filed Feb. 27, 2018, which is herein incorporated by reference in its entirety for all purposes.

BACKGROUND

The present disclosure relates generally to systems and methods for conveying relevant information to individuals or groups across an enterprise. More specifically, the present disclosure is related to systems and methods for identifying relevant information within a larger set of available information and displaying the selected information to an individual or group associated with an enterprise.

This section is intended to introduce the reader to various aspects of art that may be related to aspects of the present disclosure, which are described and/or claimed below. This discussion is believed to be helpful in providing the reader with background information to facilitate a better understanding the present disclosure. Accordingly, it should be understood that these statements are to be read in this light, and not as admissions of prior art.

An enterprise or organization may include different departments (e.g. human resources, information technology, accounting, and so forth) and each department typically includes members having different roles (e.g., managers, assistants, associates, and so forth). Further, the enterprise or organization may operate in different locations (e.g., cities, states, countries). An employee of the organization may have an inquiry, such as related to benefits, training, compensation, and so forth, but each department, member, and/or location may have different policies regarding the subject of interest. Thus, coordinating the dissemination of relevant information with respect to a given individual can be a resource intensive task.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An information technology (IT) system may include a knowledge base that includes articles or other discrete blocks of specific information pertaining to various functions or documents (e.g., training policies, vacation policies, benefit documentation, legal documents, and so forth) within the enterprise. Different blocks of information may be more relevant or suitable for different subsets of employees. For example, training and/or tax documents for a new employee may differ depending on where the employee is geographically located, what department they are hired into, their familial or marital status, and so forth. Each knowledge article may include metadata that correlates to information that may be used in characterizing an employee such that relevant information may be disseminated to an employee based on filter data (e.g., information about the respective employee). Additionally, in a separate aspect, an IT system may include a campaign database that generates or includes a set of activities that may be provided to an employee based on the employee satisfying certain trigger data (e.g., satisfying a condition).

BRIEF DESCRIPTION OF THE DRAWINGS

Various aspects of this disclosure may be better understood upon reading the following detailed description and upon reference to the drawings in which:

FIG. 8 is second image of an example user interface used for creating content data, in accordance with an embodiment;

FIG. 9 is a third image of an example user interface for creating content data, in accordance with an embodiment;

FIG. 13B is one example of displaying content data via a calendar, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Information technology (IT) devices are increasingly important in a world in which electronics devices are interconnected and prevalent. As more functions are performed by services using some form of distributed computing, IT infrastructure in increasingly relied upon to disseminate information as well as coordinate activities for different members across an enterprise. That is, IT infrastructure may be relied upon to coordinate activity and disseminate relevant information across departments of an enterprise that may be located in different places and may operate independent of each other.

To provide useful information to its employees (e.g., members), an enterprise may have numerous knowledge articles covering various topics for its employees such as legal documents and training modules. For different employees, certain subsets (e.g., knowledge blocks) of these knowledge articles may be more useful or relevant, such as based on a given employees position, department, or location. As discussed herein, employing certain IT devices, such as a server system that is communicatively coupled to databases storing documents related to the different departments, may allow the dynamically tailoring or curating of responses to requests for information such that the response has increased relevance to a requestor based on the characteristics of the requestor. Additional details with regard to the embodiments described herein will be discussed below with reference to FIGS. 1-12.

Figure 1:
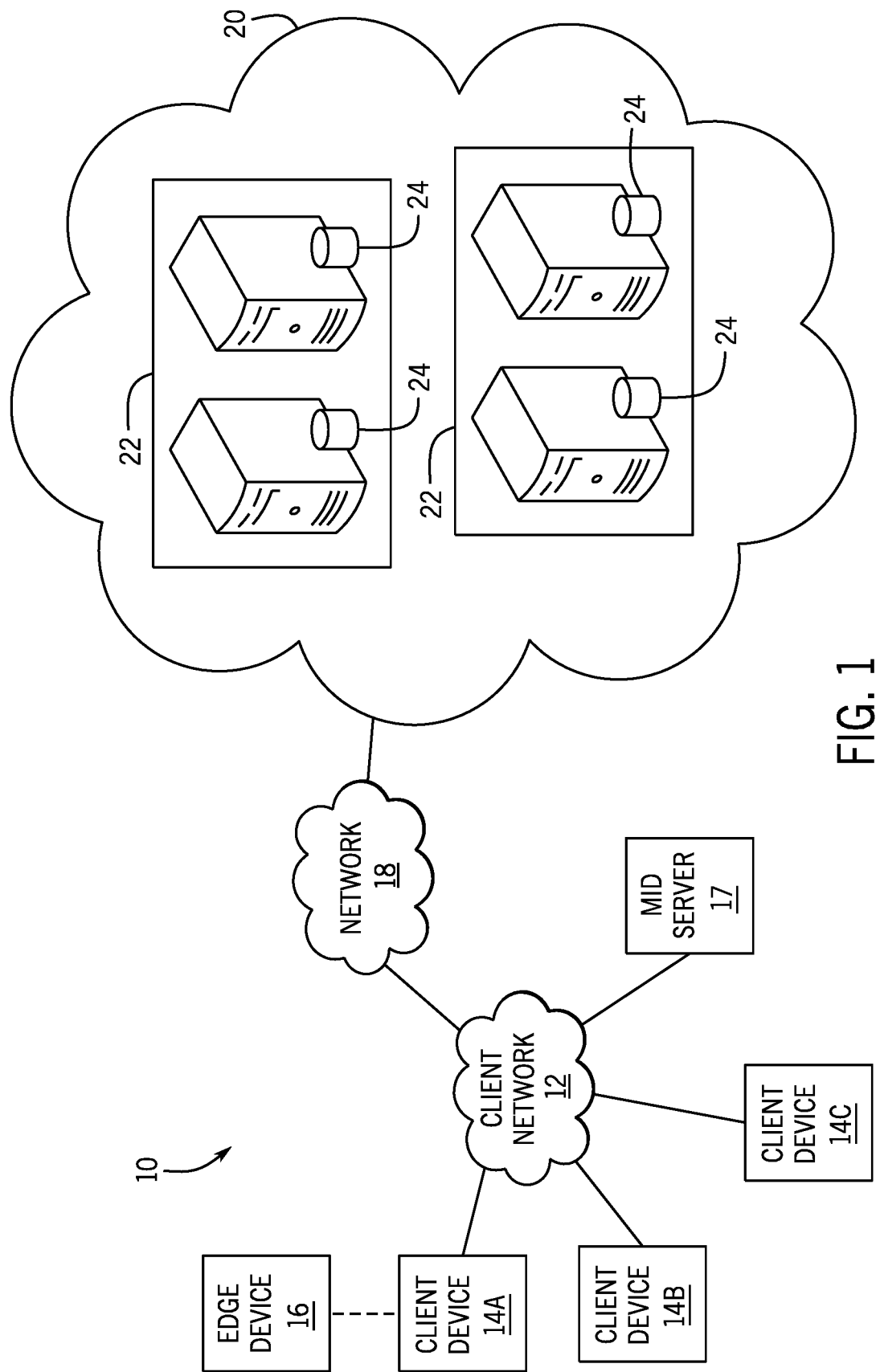
FIG. 1 is a block diagram of an embodiment of a cloud computing system in which embodiments of the present disclosure may operate.

With the preceding in mind, the following figures relate to various types of generalized system architectures or configurations that may be employed to provide services to an organization in a multi-instance framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. Computing system 10 may include a client network 12, network 18 (e.g., the Internet), and a cloud-based platform 20. In some implementations, the cloud-based platform may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 22, and/or other remote networks. As shown in FIG. 1, the client network 12 is able to connect to one or more client devices 14A, 14B, and 14C so that the client devices are able to communicate with each other and/or with the network hosting the platform 20. The client devices 14A-C may be computing systems and/or other types of computing devices generally referred to as Internet of Things (IoT) devices that access cloud computing services, for example, via a web browser application or via an edge device 16 that may act as a gateway between the client devices and the platform 20. FIG. 1 also illustrates that the client network 12 includes a management, instrumentation, and discovery (MID) server 17 that facilitates communication of data between the network hosting the platform 20, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 18. The network 18 may include one or more computing networks, such as other LANs, wide area networks (WAN), the Internet, and/or other remote networks, in order to transfer data between the client devices 14A-C and the network hosting the platform 20. Each of the computing networks within network 18 may contain wired and/or wireless programmable devices that operate in the electrical and/or optical domain. For example, network 18 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 18 may also employ any number of network communication protocols, such as Transmission Control Protocol (TCP) and Internet Protocol (IP). Although not explicitly shown in FIG. 1, network 18 may include a variety of network devices, such as servers, routers, network switches, and/or other network hardware devices configured to transport data over the network 18.

In FIG. 1, the network hosting the platform 20 may be a remote network (e.g., a cloud network) that is able to communicate with the client devices 14A-C via the client network 12 and network 18. The network hosting the platform 20 provides additional computing resources to the client devices 14A-C and/or client network 12. For example, by utilizing the network hosting the platform 20, users of client devices 14A-C are able to build and execute applications for various enterprise, IT, and/or other organization-related functions. In one embodiment, the network hosting the platform 20 is implemented on one or more data centers 22, where each data center could correspond to a different geographic location. Each of the data centers 22 includes a plurality of virtual servers 24 (also referred to herein as application nodes, application servers, virtual server instances, application instances, or application server instances), where each virtual server can be implemented on a physical computing system, such as a single electronic computing device (e.g., a single physical hardware server) or across multiple-computing devices (e.g., multiple physical hardware servers). Examples of virtual servers 24 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 20, network operators may choose to configure the data centers 22 using a variety of computing infrastructures. In one embodiment, one or more of the data centers 22 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server and/or other combinations of physical and/or virtual servers 24, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 20, and customer-driven upgrade schedules. An example of implementing a customer instance within a multi-instance cloud architecture will be discussed in more detail below with reference to FIG. 2.

Figure 2:
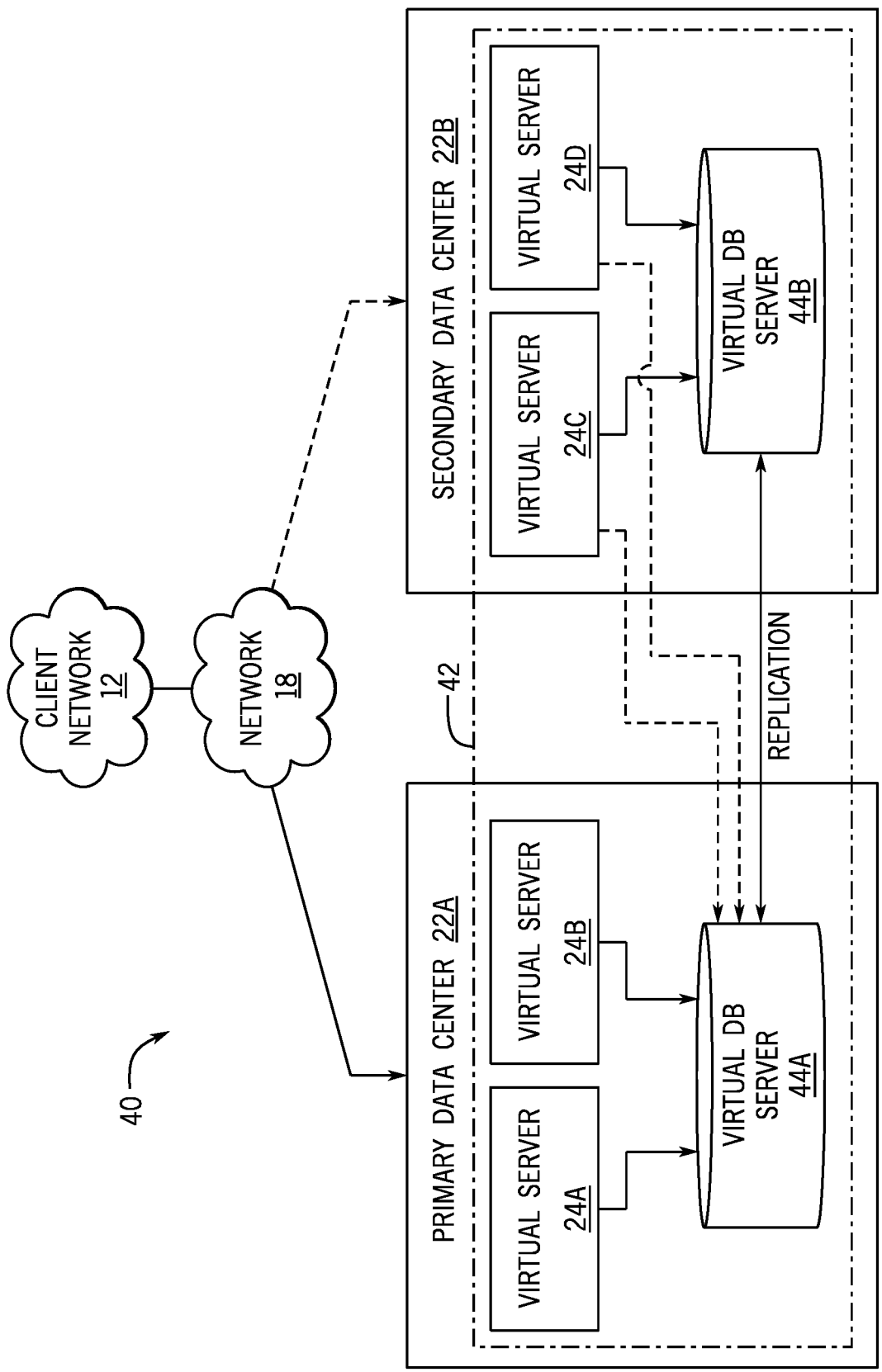
FIG. 2 is a block diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 40 includes the client network 12 and the network 18 that connect to two (e.g., paired) data centers 22A and 22B that may be geographically separated from one another. Using FIG. 2 as an example, network environment and service provider cloud infrastructure client instance 42 (also referred to herein as a simply client instance 42) is associated with (e.g., supported and enabled by) dedicated virtual servers (e.g., virtual servers 24A, 24B, 24C, and 24D) and dedicated database servers (e.g., virtual database servers 44A and 44B). Stated another way, the virtual servers 24A-24D and virtual database servers 44A and 44B are not shared with other client instances but are specific to the respective client instance 42. Other embodiments of the multi-instance cloud architecture 40 could include other types of dedicated virtual servers, such as a web server. For example, the client instance 42 could be associated with (e.g., supported and enabled by) the dedicated virtual servers 24A-24D, dedicated virtual database servers 44A and 44B, and additional dedicated virtual web servers (not shown in FIG. 2).

In the depicted example, to facilitate availability of the client instance 42, the virtual servers 24A-24D and virtual database servers 44A and 44B are allocated to two different data centers 22A and 22B, where one of the data centers 22 acts as a backup data center. In reference to FIG. 2, data center 22A acts as a primary data center 22A that includes a primary pair of virtual servers 24A and 24B and the primary virtual database server 44A associated with the client instance 42, and data center 22B acts as a secondary data center 22B to back up the primary data center 22A for the client instance 42. To back up the primary data center 22A for the client instance 42, the secondary data center 22 includes a secondary pair of virtual servers 24C and 24D and a secondary virtual database server 44B. The primary virtual database server 44A is able to replicate data to the secondary virtual database server 44B.

As shown in FIG. 2, the primary virtual database server 44A may replicate data to the secondary virtual database server 44B using, e.g., a Master-Master MySQL Binlog replication operation. The replication of data between data could be implemented by performing full backups weekly and daily incremental backups in both data centers 22A and 22B. Having both a primary data center 22A and secondary data center 22B allows data traffic that typically travels to the primary data center 22A for the client instance 42 to be diverted to the second data center 22B during a failure and/or maintenance scenario. Using FIG. 2 as an example, if the virtual servers 24A and 24B and/or primary virtual database server 44A fails and/or is under maintenance, data traffic for client instances 42 can be diverted to the secondary virtual servers 24C and the secondary virtual database server instance 44B for processing.

Although FIGS. 1 and 2 illustrate specific embodiments of a cloud computing system 10 and a multi-instance cloud architecture 40, respectively, the disclosure is not limited to the specific embodiments illustrated in FIGS. 1 and 2. For instance, although FIG. 1 illustrates that the platform 20 is implemented using data centers, other embodiments of the platform 20 are not limited to data centers and can utilize other types of remote network infrastructures. Moreover, other embodiments of the present disclosure may combine one or more different virtual server into a single virtual server. Using FIG. 2 as an example, the virtual servers 24A-D and virtual database servers 44A and 44B may be combined into a single virtual server. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
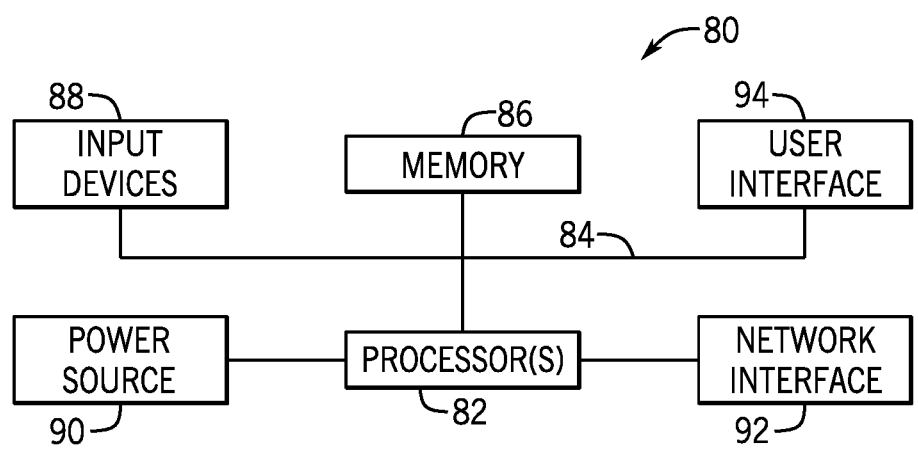
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 80 and their potential interconnections or communication paths, such as along one or more busses. As illustrated, the computing system 80 may include various hardware components such as, but not limited to, one or more processors 82, one or more busses 84, memory 86, input devices 88, a power source 90, a network interface 92, a user interface 94, and/or other computer components useful in performing the functions described herein.

The one or more processors 82 may include one or more microprocessors capable of performing instructions stored in the memory 86. Additionally or alternatively, the one or more processors 82 may include application-specific integrated circuits (ASICs), field-programmable gate arrays (FPGAs), and/or other devices designed to perform some or all of the functions discussed herein without calling instructions from the memory 86.

With respect to other components, the one or more busses 84 includes suitable electrical channels to provide data and/or power between the various components of the computing system 80. The memory 86 may include any tangible, non-transitory, and computer-readable storage media. Although shown as a single block in FIG. 1, the memory 86 can be implemented using multiple physical units of the same or different types in one or more physical locations. The input devices 88 correspond to structures to input data and/or commands to the one or more processor 82. For example, the input devices 88 may include a mouse, touchpad, touchscreen, keyboard and the like. The power source 90 can be any suitable source for power of the various components of the computing device 80, such as line power and/or a battery source. The network interface 92 includes one or more transceivers capable of communicating with other devices over one or more networks (e.g., a communication channel). The network interface 92 may provide a wired network interface or a wireless network interface. A user interface 94 may include a display that is configured to display text or images transferred to it from the one or more processors 82. In addition and/or alternative to the display, the user interface 94 may include other devices for interfacing with a user, such as lights (e.g., LEDs), speakers, and the like.

Figure 4:
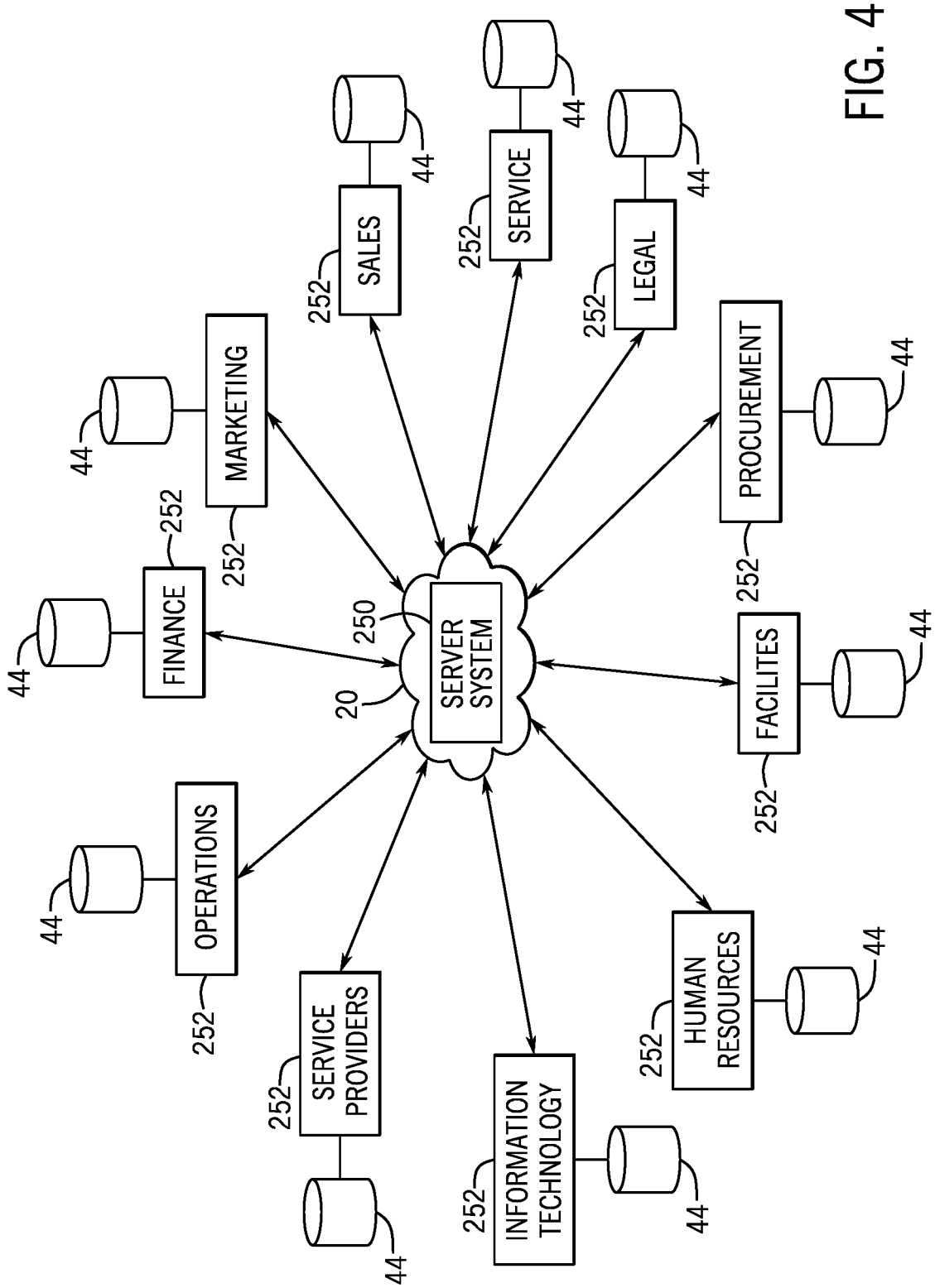
FIG. 4 is a block diagram of an example server system that may be part of the distributed computing system of FIG. 1, in accordance with an embodiment.

With the preceding in mind, FIG. 4 illustrates a block diagram of an example server system that may be communicatively coupled to different department server systems via the cloud service 20. As mentioned above, an enterprise or organization may be made up of a number of different departments. In one embodiment, server system 250 may be a computing system 80 or the like accessible to the cloud service 20. The server system 250 may access different databases 44 associated with different departments to access knowledge documents or templates, information about a requestor, or activities and tasks relevant to a given department so as to implement the present approaches. In the depicted example, each database 44 associated with a respective department may communicate with the server system 250 via the cloud service 20 and a respective server system associated with the respective database. For example, FIG. 4 illustrates a number of server systems that may facilitate communication to, query requests, and the like with a respective database 44.

By way of example, the department server systems may be associated with departments 252 such as an operations department, a finance department, a marketing department, a sales department, a service department, a legal department, a procurement department, a facilities department, a human resources department, an information technology department, a service providers department, and the like. It should be noted that the preceding list of departments should not be construed as an exclusive list of departments; instead, listed departments are provided as examples and a given enterprise may include additional departments and additional operations and tasks for the described departments.

Generally, a database 44 associated with each department may include data related to the members of the enterprise that are also part of the respective department, tasks or activities to be performed by the department, calendar information related to the events scheduled for the respective department, knowledge documents relevant to the function of the department, and the like. In one embodiment, the data related to the members of the department may include a working schedule of the member, a list of skills of the member, a list of job functions performed by the member, and the like.

Figure 5:
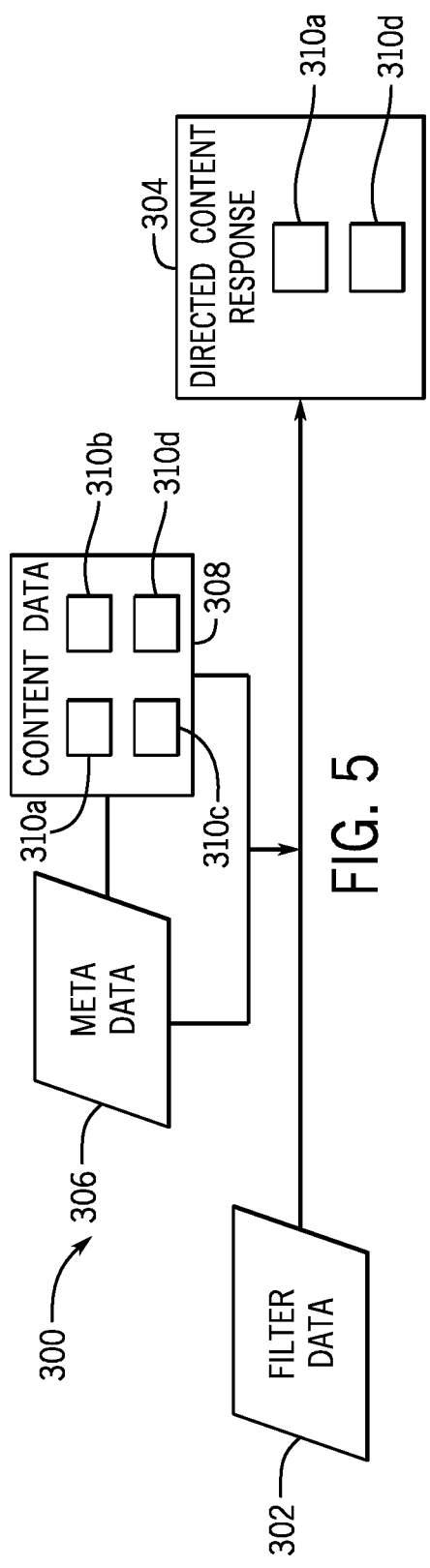
FIG. 5 is a flow diagram for one implementation of producing directed content data, in accordance with an embodiment.

Given the number of different departments associated with a single enterprise, as illustrated in FIG. 4, it may prove to be difficult to disseminate suitable knowledge and coordinate activities across the enterprise. For example, an employee who needs to sign a legal document that is generically drafted to cover all employees of an enterprise may only need to review those portions specifically applicable to the employee. As such, as discussed herein departments of the enterprise may coordinate in the generation of directed content data corresponding to or excerpted from a larger stores of available content data. By way of example, FIG. 5 illustrates a flow diagram 300 that shows how directed content data (e.g., a curated response) is generated in response to a request. In general, filter data 302 is used to generate directed content response 304 based on metadata 306 associated with content data 308 (i.e., a knowledge store, article, document, policy, and so forth) and/or subsets 310a, 310b, 310c, and 310d (i.e., knowledge blocks) of the content data. The directed content response 304 includes one or more subsets 310 of content data determined to be relevant to a requestor's inquiry (e.g., 310a, 310d) based on characteristics of the requestor, which may be captured by the represented filter data 302. It should be understood that the subsets 310 (i.e., knowledge blocks) of content data that are present in the directed content response 304 are not limited to subsets of content data from a single content data 308 store or document, but may be drawn from a variety of sources of content determined (based on metadata 306) to be relevant to a particular requestor and inquiry. In some embodiments, the subsets 310 of content data used to generate the directed content response 304 may come from multiple different content data 308 documents or repositories. In other embodiments, the directed content response 304 may be generated from one or more complete content data 308 documents rather than from subsets 310 of content data drawn from the larger document, such as where the entire document is relevant to a requestor and their inquiry.

Figure 6:
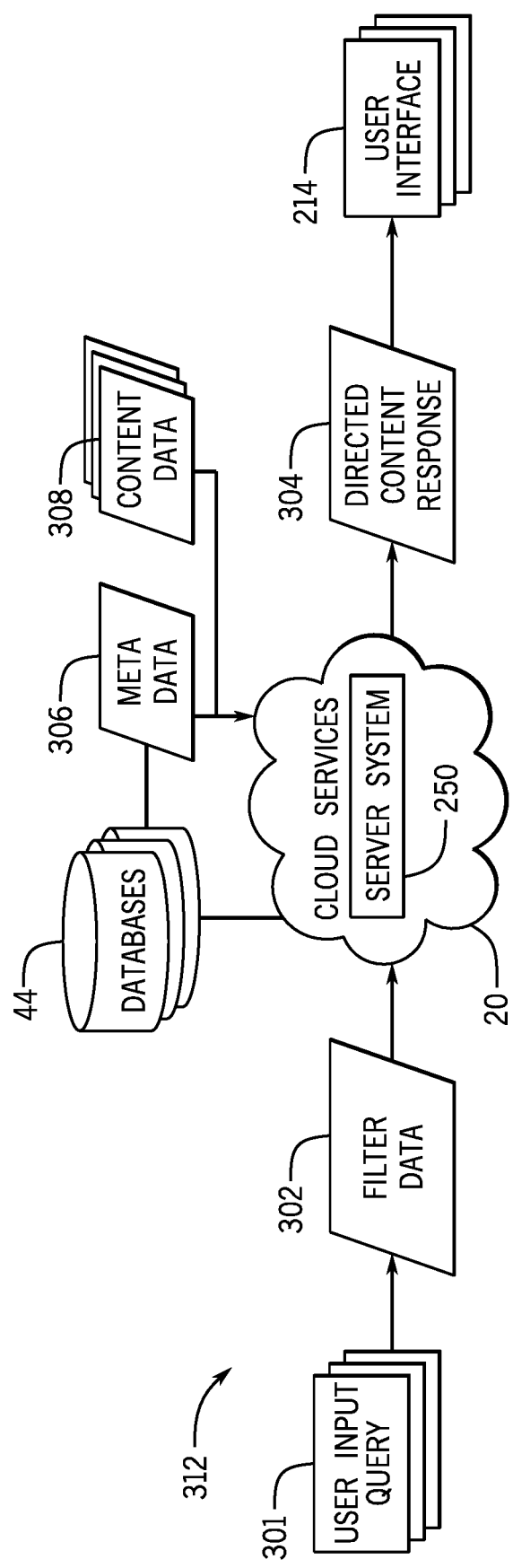
FIG. 6 is a flow diagram for one implementation of providing directed content data to a user interface, in accordance with an embodiment.

FIG. 6 illustrates a flow diagram 312 that shows how directed content response 304 may be provided to a user in response to the user requesting information. In some embodiments, the directed content may be selected and/or provided to the entire enterprise or to various subsets (e.g., departments, positions) of the enterprise. As shown in FIG. 6, in response to a user input query 301, a set of filter data 302 may be generated to a respective search engine, which in the depicted example is instantiated as a cloud service 20 (e.g., a user may initialize a search on a search engine). The filter data 302 may include search terms provided by the requestor of the information as well as one or more characteristics of the requestor that may be used to curate a response, such as demographic information about the requestor (e.g., marital status, gender, age, physical characteristics), geographic information relevant to the requestor (e.g., a country, state, or city of residence), employment information about the requestor (e.g., job title, pay grade, office location). The information pertaining to relevant characteristics of the requestor may be automatically retrieved and supplied as filter data 302 from one or more databases 44 in the larger organization, such that the provision of this information is transparent to the requestor.

With respect to generating a response, the enterprise may store or have access to multiple content data 308 (e.g., knowledge documents, policies, articles, and so forth) that are stored in one or more accessible databases 44. Each source of content data 308 may be direct towards various topics or functions within an enterprise and some or all of the content data 308 may include subsets 310 of the content data, which may be characterized herein as knowledge blocks, related to particular sub-topics of the larger data set. For example, metadata 306 may identify a respective document as related to Employee Benefits, while respective subsets of the document may in turn be identified by respective tags or metadata as being relevant to particular geographic regions (e.g., countries, states), job descriptions (e.g., management, non-management, engineer, non-technical), ages (e.g., over 55, under 55), genders and so forth). The respective metadata tags associated with content data 308 and content subsets 310 may be searchable based on the provided filter data 302 to identify those particular content and content subsets (i.e., knowledge blocks) relevant to an inquiry (e.g., user input query 301) by a particular requestor. As such, the filter data 302 determines which content data 308 and/or subsets 310 of the content data are used to generate the directed content response 304 returned as a response to an inquiry by a given requestor.

As a non-limiting example, a user who works for an organization may use client 14 to search for "training documents for new employees." The filter data 302 may specify (e.g., based on information stored in the database(s) 44) that the user is a manager of the sales department and works in the London offices of the organization. Based on words in the search, a document containing various policies of the organization is selected as having relevant content data 308. The document may include multiple sections, such as training for different departments (e.g., sales, human resources) and training for specific locations (e.g., countries, cities, etc.), and a section for all new employees. As discussed herein, each sub-section (e.g., subsets 310) may be tagged with suitable metadata. For example, the section regarding training for the sales department is tagged with metadata 306 that is associated with filter data 302 related to sales employees. Thus, the section related to sales training, training for employees in London, and the section for all new employees may be selected to generate a response in the form of directed content response 304, with non-relevant content (based on metadata 306) being excluded from the response. Accordingly, these three selected sections or knowledge blocks may be assembled into a response to return to the requestor, such as for display on user interface 94 of the client device 14 or as a document (e.g., PDF, text document) that includes each of the assembled knowledge blocks. Additionally, the selected knowledge blocks of content may be organized based on which subsets of content may be more relevant to the user (e.g., based on overlap between the filter data and the meta data associated with each knowledge block) or based on other criteria determined to be useful in organizing a response (e.g., general guidance provide above exceptions and exclusions, and so forth). In some embodiments, the response may be dynamically generated and/or displayed while the user is inputting the search terms. For example, the user may input one or more words as search terms and receive a first response based the terms as they are being inputted. As the user inputs additional terms, a new response may be generated or the previous response may be modified (e.g., one or more knowledge blocks may be added or removed).

Figure 7:
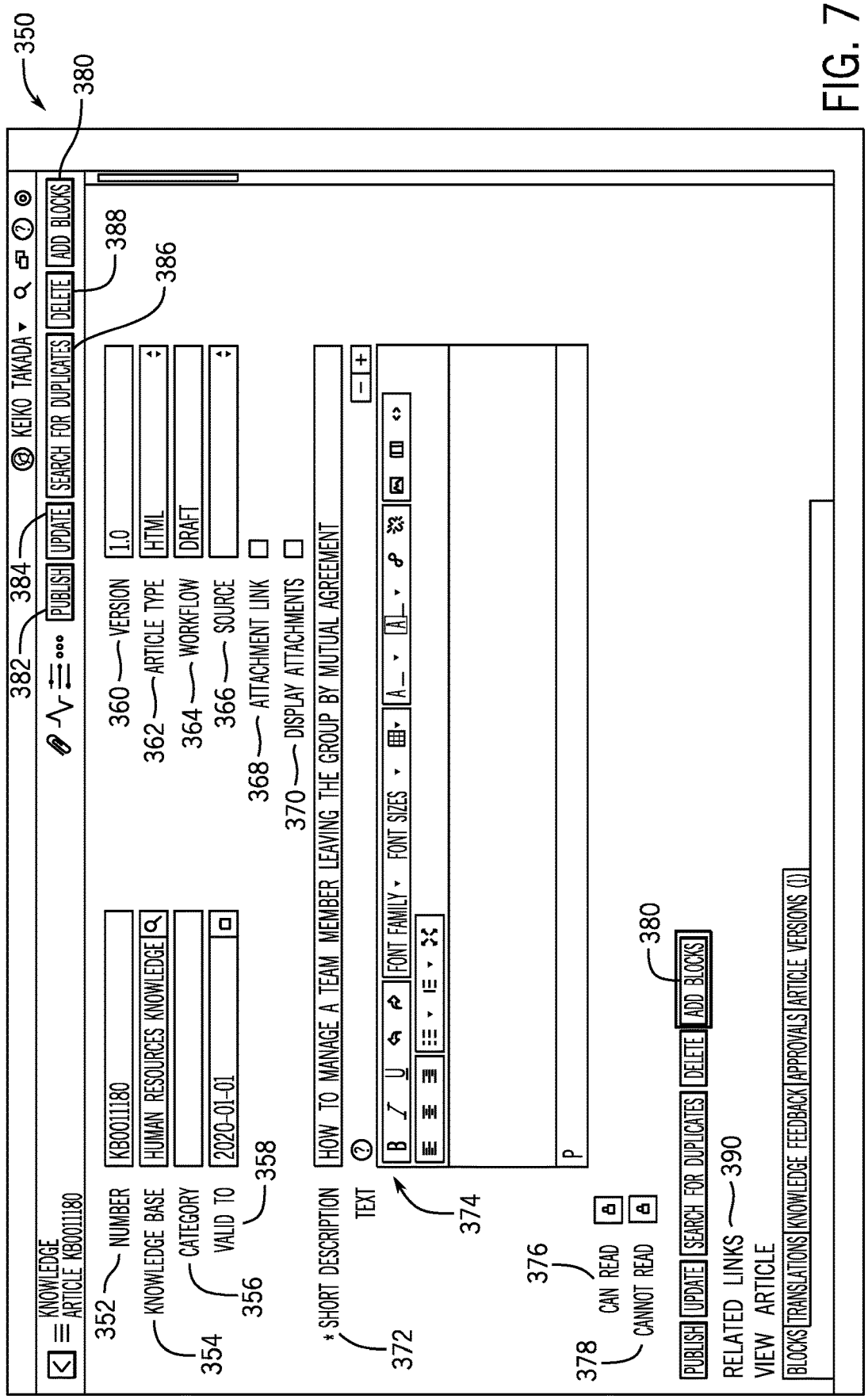
FIG. 7 is an image of an example user interface used for creating content data, in accordance with an embodiment.

With respect to assignment of metadata 306 or tags to content 308 or subsets 301 of content, such metadata may be assigned by an initial content creator or by a later reviewer of the content. With the preceding in mind, FIG. 7 shows an interactive window 350 for article (e.g., content data 308) creation, in accordance with an embodiment of the present disclosure. In general, the interactive window facilitates assembling an article having subsets 310 or subtopics of content, which may be new or pre-existing subsets of content. The interactive window 350 displays multiple inputs and tabs for viewing the article as it is being developed by a content creator. As illustrated, the interactive window includes a number 352, knowledge base (e.g., 'human resource knowledge'), and category 356 which the content creator may assign to organize the article, as well as define some associated metadata to the article (e.g., knowledge article) or subsets of the article (e.g., knowledge blocks). For example, as discussed herein, the content creator may make an article specific to a user based on their job position, location of work, or various activities associated with an enterprise (e.g., training, hiring, firing, tax documents, legal documents, safety drills.) Additionally, the content creator may decide a date that the article may be valid until (e.g., numeral 358).

Continuing with the other features illustrated in FIG. 7, the content creator may assign a version 360, an article type 362 (e.g., 'HTML'), workflow 364 (e.g., the content creator may annotate an article as a 'draft'), and source 366, which may facilitate organization of the article, the subsets of the article, and/or maintenance of the article, for example. Further, the content creator may have options for an attachment link 368 and whether or not to display attachments 370.

The interactive window 350 includes additional tools to aid the content creator in developing the article. The content creator may include a short description 372 of the article. The short description 372 may be displayed to a viewer (e.g., user or content creator) during a search (e.g., text search), or by the content creator and/or other content creators that are organizing article(s) as discussed herein. Further, the content creator may modify/develop the article with an input window (e.g., numeral 374). In some embodiments, the input window may include text that may be an answer to a commonly asked question. Furthermore, the content creator may choose to display a summary of the information in the input window, rather than displaying all the subsets of the article (e.g., as a list). As shown, the input window may be a word processing portion; however, the input window may not be limited to text, but may also include images and videos. The content creator may type text into the input window, use portions of text from other article, and/or use previously developed articles, as discussed herein. The interactive window 350 also includes a 'can read' selection 376 and a 'cannot read' selection 378, where the user may decide whom the article and/or the subsets of the article are most relevant for. Multiple inputs (e.g., knowledge base 354, category 356, valid to 358, article type 362, source 366, attachment link 368, short description 372, can read selection 376, and cannot read selection 378, etc.) shown in the interactive window 350 may affect the metadata 306 associated with the article.

During development, as well as editing, of the article being developed in the interactive window 350, the content creator may have several options for executing actions on the knowledge block. As shown, the content creator may publish the article (numeral 382) and update the article based on edits/changes (numeral 384). The content creator may also decide to search for duplicates (numeral 386) to determine if the article already exists. The search for duplicates may use a portion of the inputs shown in the interactive window 350 to determine if the article is a duplicate. The search may include the knowledge base 354 (e.g., a database containing relevant information) and at least a portion of the short description 372, the input window 374, or any combination thereof, to make the determination. For example, if the content creator is developing an article on managing team member leaving a group, the content creator may type 'how to manage a team member leaving a group' in the short description 372 and 'Human Resource Knowledge' in the knowledge base 354 input. Upon the content creator initializing a search for duplicates (e.g., via the selection shown by numeral 386), a search may use the inputs (e.g., short description 372 and knowledge base 354) provided by the content creator to query if any other articles that are similar to the currently developed article exists. If the content creator determines that the article is redundant (e.g., based on the output of the search for duplicates 386) or if the knowledge block is outdated, the content creator may delete the article (numeral 386). Additionally, the content creator may have an option to test the output of the article. That is, the content creator may view the article as if they were an employee having certain metadata (e.g., view the knowledge block as a manager of the human resource department).

Figure 8:
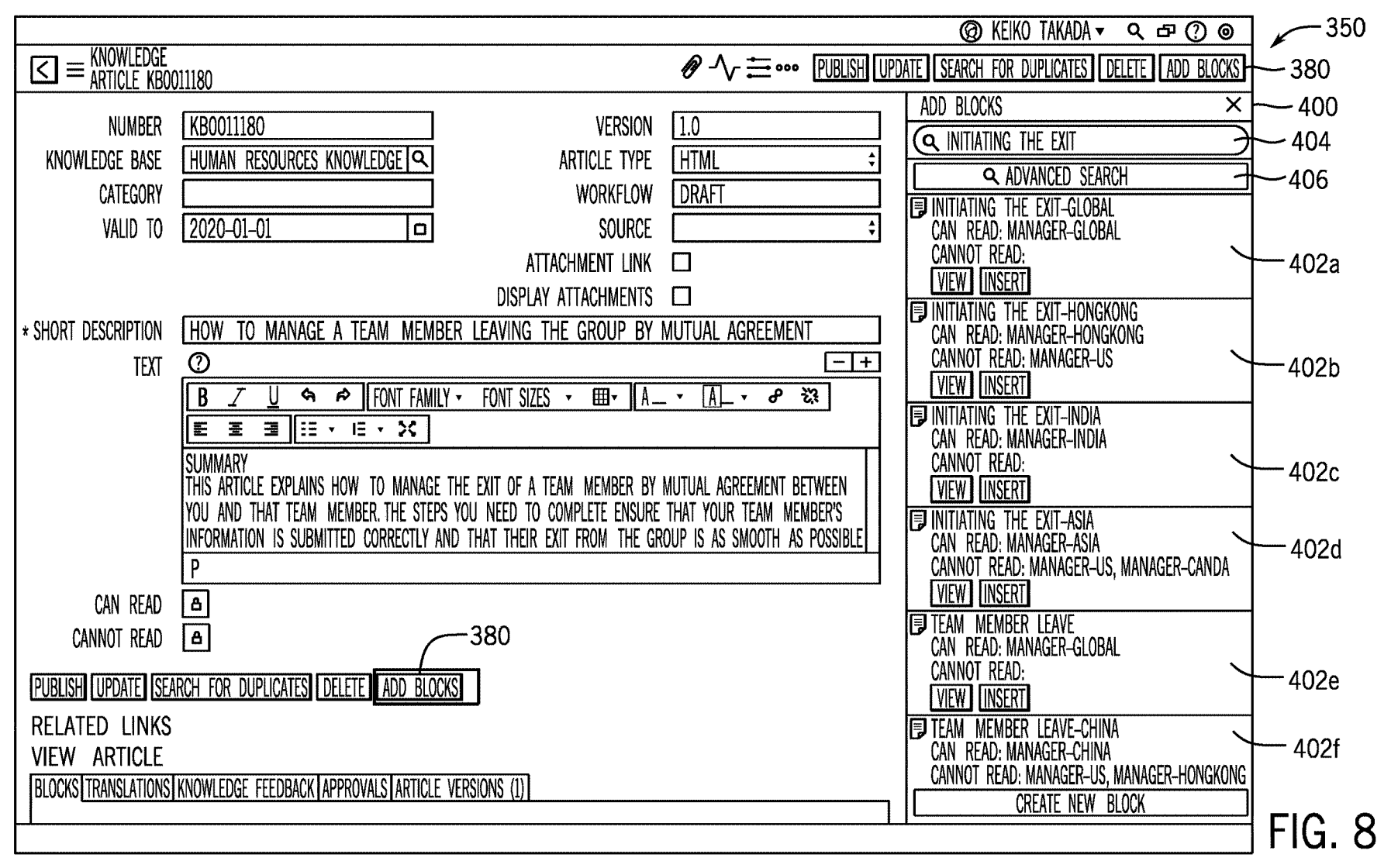
Figure 9:
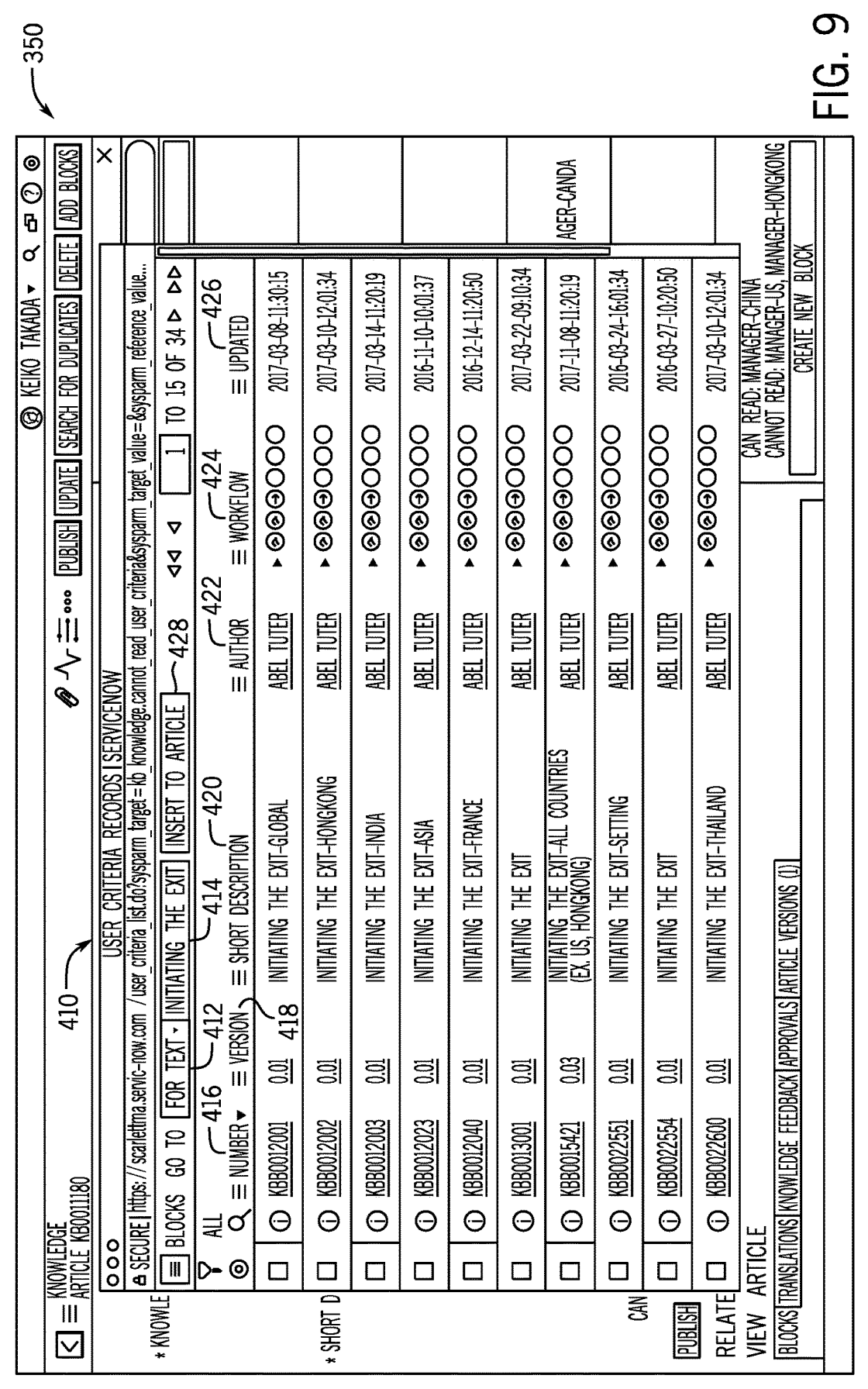

As illustrated, the interactive window 350 includes an 'add blocks' selection (numeral 380). In some embodiments, multiple subsets of articles from pre-existing articles may be relevant for the article. For example, an article for a new employ of a particular department may include tax forms, training documents, a map of the building, a list of holidays, etc., which may all be included in the article. Upon the content creator executing the 'add blocks' selection 380, a 'add blocks' interactive window 400 may appear with multiple subsets of articles (e.g., 402a, 402b, 402c, 402d, 402e, 402f) as shown in FIG. 8. The content creator may decide on adding any number or combination of these subsets of articles 402a, 402b, 402c, 402d, 402e, 402f Further, the 'add blocks' interactive window 400 includes a text search input 404, which may either prompt the content creator for input to use in a text search, or use a portion of the short description 372 to execute a search. Even further, the 'add blocks' interactive window 400 may include an 'advanced search' selection 406, which may result in an 'advanced search' interactive window 410 as shown in FIG. 9. The 'advanced search' interactive window 410 may include more detail of the subsets of pre-existing articles (e.g., previously shown as 402a, 402b, 402c, 402d, 402e, 402f) as well as various ways of organizing the subsets of pre-existing articles displayed as a result of the advanced search. For example, the 'advanced search' interactive window 410 may include a selection (numeral 412) such as a drop down menu of where to look for an input 414. The 'advanced search' results may be displayed and organized based on ranking the subsets of articles number 416, version 418, short description 420, author 422, workflow 424, and last updated 426. If the content creator decides that one or more of the subsets of pre-existing articles displayed in the 'advanced search' interactive window 410 should appear in the article (e.g., in the input window 374), the user may use the 'insert to article' selection 428.

Figure 10:
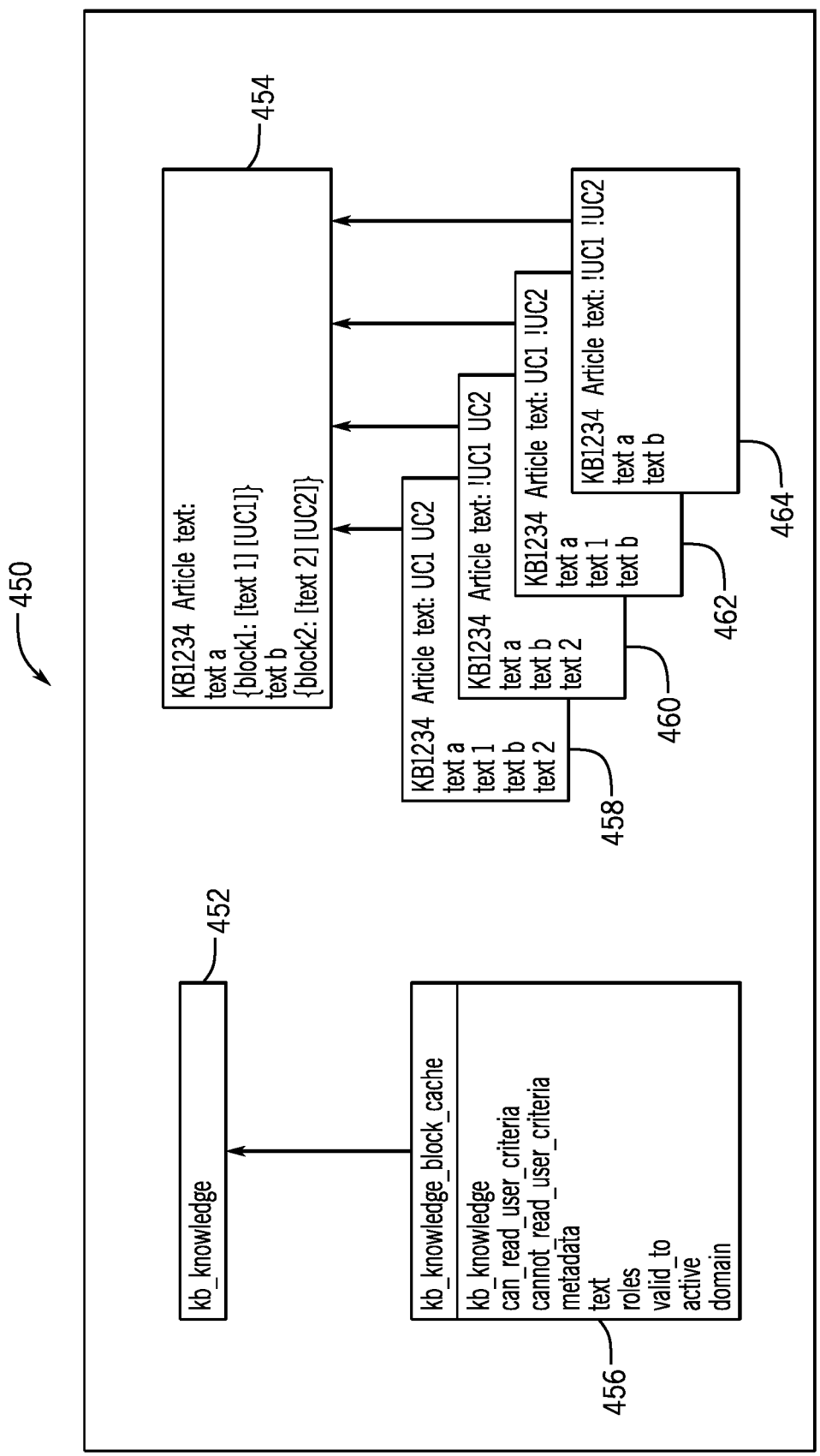
FIG. 10 is a schematic diagram that illustrates how content data may be targeted to a user, in accordance with an embodiment.

As discussed herein, a knowledge article may contain multiple portions of text and certain portions of the text may be better suited for one group of employees than other. A knowledge block may be created from each portion of text and each knowledge block may have a set of criteria (e.g., selected by a content creator or operator) that determines who the knowledge block is suited for. FIG. 10 depicts a general overview of how a specific knowledge block selected. A knowledge block 452 has an associated cache 456 (e.g., kb_knowledge_block_cache). The cache 456 may include a title, a can read or cannot read user criteria, metadata, text, roles, valid to (e.g., valid to dates), an indication if the knowledge block 452 is active, and an associated domain. While one or all of these features may be part of the cache 456 of knowledge block 452, the content creator may decide to display the text while using the features of the cache 456 to facilitate determining which user (e.g., employee) will see a knowledge block of an article as discussed herein.

As shown, an article 454 may include one or multiple subsets of the article (e.g., 'text a', 'text 1', 'text b', and 'text 2'). Each of the subsets of the article 545 may have an associated criteria which determines who may view the article or who the suitable recipient of the article is. For example, 'text 1' and 'text 2' have associated rules (e.g., 'text 1' is assigned to 'block 1' and has an associated user criteria, UC1), whereas 'text a' and 'text b' do not have associated user criteria. As such, a user who executes a search that results in the article 454 being displayed to the user will see certain subsets of the article (e.g., text) as an assembled directed content data 458, 460, 462, and 464 based on whether the user satisfies one or both of the user criteria. For example, a user satisfying both user criteria '1' (UC1) and user criteria '2' (UC2) would receive all the text from article 454 (e.g., 'text a', 'text 1', 'text b', and 'text 2') would receive the directed content data 458 (e.g., via the user interface 94). As shown in directed content data 460, a user satisfying user criteria '2' and not user criteria '1' would receive 'text a', 'text b', and 'text 2'. As shown in directed content data 462, a user satisfying user criteria '1' and not user criteria '2' would receive 'text a', 'text a', and 'text b'. As shown in directed content data 464, a user that satisfies neither user criteria '1' nor user criteria '2' would receive 'text a' and 'text b'. In some embodiments, the order of the display text may vary depending on relevancy to a search performed by the user.

The discussion above relates to the provision of selected or limited content in response to a search for the purpose of self service/self help such that a member of the organization may pull (e.g., receive via a search) content most specific or relevant to the searcher. That is, as discussed herein, one embodiment of the present disclosure generally relates to providing directed content data based on the identify and characteristics of the searcher and on the actual search terms or parameters. An enterprise may have numerous departments and it may be difficult to provide relevant information to each employee based on their inquiry and individual circumstances. As discussed above, the present approach generates curated responses in the form of directed content data having the most relevant content data or subsets of the content data for a respective individual.

Another aspect of the present disclosure is directed towards providing predesigned or configured content to an employee through a campaign. As used herein, campaigns relate to pushing (e.g., sending) pre-configured or predetermined content data out to all members of an organization or a subset of the members via various content channels (e.g., web, email, etc.) and in response to specified trigger events, such as events related to employment dates or anniversaries, calendar-based events, holidays, life events (e.g., birthdays, anniversaries, and so forth). Such campaign driven data dissemination may be useful when an employee may not have time to look for content, or may not know what to look for. For example, a new employee to an enterprise may not know all of the required expectations of a new employee (e.g., tax documents, meetings to attend, training seminars). Even an employee who has worked for an organization for several weeks, months, or years may not know all of the protocols (e.g., asking for vacation days, hiring procedures, taking sick days, etc.) relating to the enterprise.

Additionally, a manager of the enterprise may want to track performance of an employee and offer congratulations during various milestones (e.g., employment anniversaries, performance reviews), however may not have an efficient method for tracking how long the employee has worked at the enterprise. Additionally, a new or existing employee may have annual benefits renewals or similar obligations within an enterprise. In these embodiments, it may be more beneficial to provide the information to the employee or manager without the employee or manager having to search for the information. Accordingly it may be beneficial to enroll the employee in a campaign that provides scheduled or configured content based on trigger data and/or time intervals. In some embodiments, the configured content may include one or more activities.

Further, employing certain IT devices, such as a server system that is communicatively coupled to databases related to the different departments, may allow the implementation of dynamic workflows that send relevant sets of instructions to user interfaces of different members based on the occurrence of certain events. For example, after receiving an indication that a role of a member of an enterprise is changing, a new member is being added to the enterprise, a social or work event is planned for a department or group, and so forth, routines executing on the IT infrastructure may dynamically determine particular campaigns that generate targeted data for different members or detail activities for different members to perform for different departments based on the information available on the databases associated with the different departments and the indication.

For example, in one implementation, each campaign may be a virtual container that lists a number of activities that may be performed in response to an event in an organization or other specified trigger. Examples of such events may include, but are not limited to: firm social events, firm holidays, new employment, a promotion, transition to a new location, and so forth. In another implementation, the campaigns may be a virtual container that includes a number of configured content data that may be provided to a member of the enterprise based on trigger data and/or time intervals. However, it should be noted that each configured content data of a campaign need not be explicitly assigned or initiated. For instance, providing of configured content data may be based on whether a member associated with the event matches certain criteria that specifies when a respective configured content data will be provided to a respective fulfiller or employee. After determining the relevant campaigns, determining which configured content data of the campaign have criteria that match properties (e.g., location, job title) of the individual(s) associated with the an event, the server system may store the identified configured content data and/or activities for the members in a database that may be accessible to computing devices or accounts associated with the identified members.

In one embodiment, once trigger data associated with a campaign occurs or is observed the employee or other individual is enrolled in a campaign. The campaign may provide pre-determined or configured content data to the employee at regular intervals consistent with the objective of the campaign, such as to induce attendance at an event or performance of a task or objective.

Figure 11:
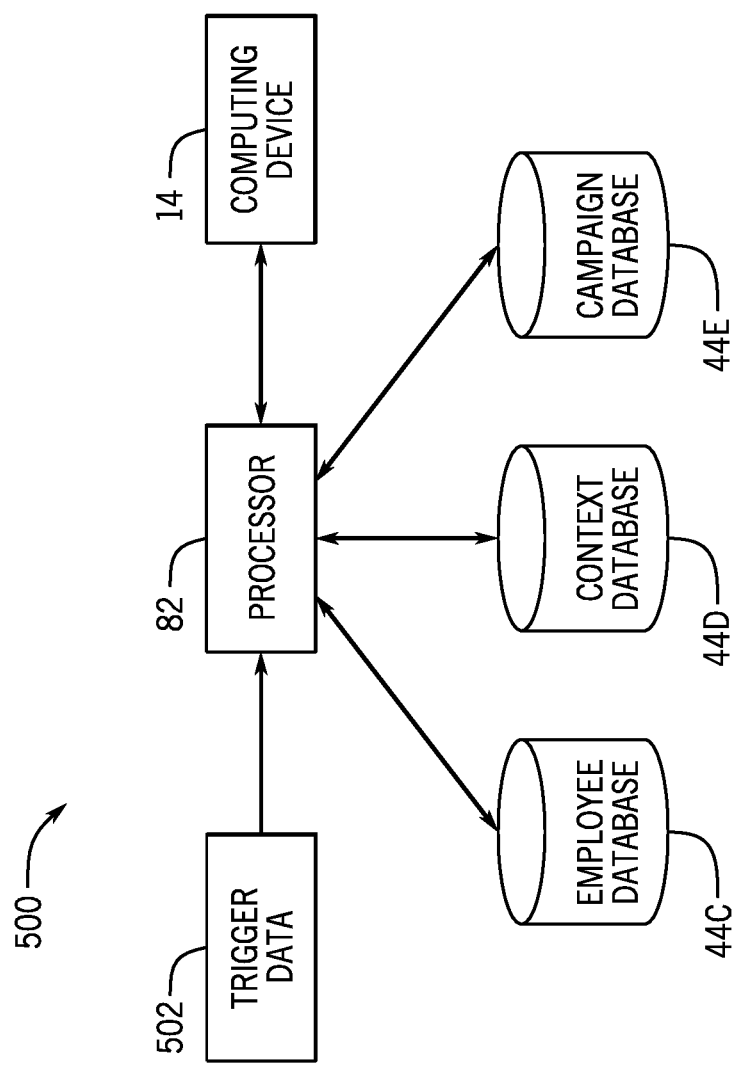
FIG. 11 is a block diagram for one implementation of delivery targeted content to a computing device based on trigger data, in accordance with an embodiment.

FIG. 11 illustrates a flow diagram 500 of a content data system that indicates how campaign data may be provided to a computing device. As shown in FIG. 11, the trigger data 502 may be provided, such as via a cloud service 20, to a processing device 82 executing routines for implementing a campaign. As described herein, trigger data 502 may consist of keywords based on a search from an employee or other data requestor. Additionally, trigger data 502 may result from the employee reaching a milestone (e.g., completing a first day at work, working for 30 days, working a year, receiving a promotion) or otherwise meeting a criteria of the campaign, such as location at a particular work site The processor 82 then retrieves relevant data from various databases 44 (e.g., 44C, 44D, and/or 44E) and provides targeted data for the user via a computing device 14 used by the employee. For example, based on a user being at a location where an employee meeting is scheduled in the future, the processor 82 might identify the employee from an employee database 44C, store the data related to the employee (e.g., name, date of query, location of employee's work or residence) in the campaign database 44E and provide the employee data from the content database 44D based on the campaign database 44E and/or the employee database 44C.

In another example, an employee may have started their first day at work. As such, an employee may be assigned an online profile stored in the database, which includes data relating to the start date of the employee. Additionally, as the employee is identified as a new employee by the processor 82, the employee is enrolled in a campaign for new hires. As discussed herein, the campaign includes campaign data that is transmitted to an employee to communicate and educate the employee through various channels (e.g., email, web, portal, and the like). As such, the employee will receive content from the content database 44D and/or campaign database 44E at predetermined time intervals relating to how many days the employee has been working at the enterprise. For example, a new employee may receive a checklist for new hires that contains a list of documents they may need to sign (e.g., health insurance policies, non-disclosure agreements). After the employee has worked for one week (e.g., the employee's online profile is 7 days old), this will result in trigger data 502 sent to the processor 82 and the employee may be provided with content relevant for working at the enterprise for one week. For example, the employee might receive an email of congratulations. Further, the content data provided to the new hire may be a list of dates and times associated with a social event. As such, the location of the employee's work would be relevant such content data.

Figure 12:
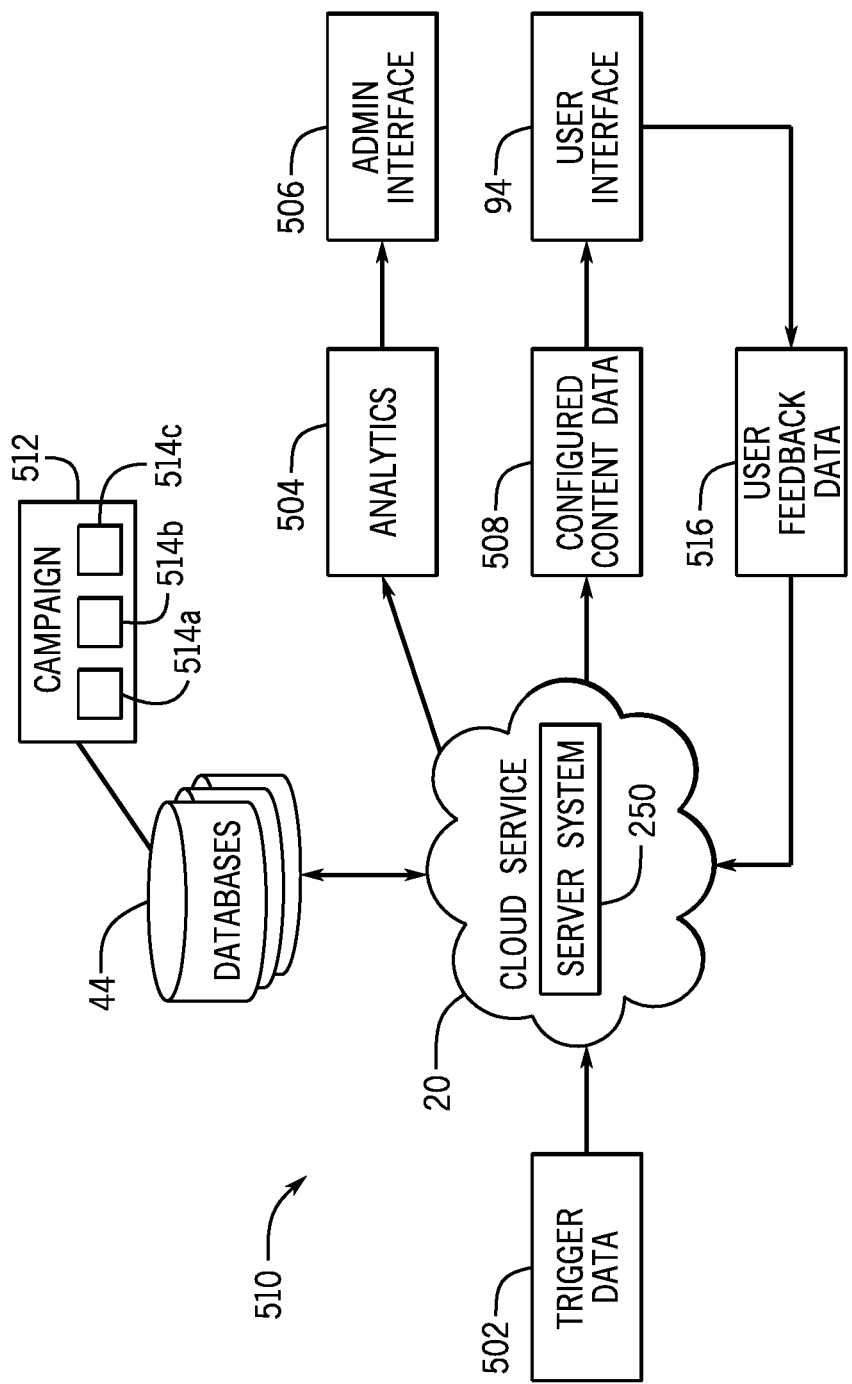
FIG. 12 is a flow diagram of producing content data based on trigger data, in accordance with an embodiment.

FIG. 12 illustrates another flow diagram 510 of providing configured content data 508 to an employee. In general, trigger data 502 received by the cloud service 20 may result in an employee being enrolled in a campaign 512. Enrollment in a campaign 512 results in providing subsets of the campaign data 514a, 514b, and 514c as configured content data 508 based on the received trigger data 502. As described herein, trigger data 502 is received which indicates a state (e.g., number of days working, an instance of searching for a key term, a milestone in employment). Configured content data 508 is provided to the employee via the user interface 94, and the configured content data 508 is one or more campaign data (e.g., from 514a, 514b, and 514c) stored in the database and associated with a campaign 512. In addition to providing the campaign data 508, it may be beneficial to track how the employee interacts (e.g., do they read/view, discussed further herein) with the campaign data 508. As such, user feedback data 516 may be obtained based on recording whether or not the user reads or accesses the configured content data 508 provided to them. Based on the user feedback data 516, analytics 504 are provided to an admin interface 506 (e.g., of the human resource department). The analytics may include data regarding the frequency of access of the content data for an individual employee or a group of employee, and further the analytics may be directed towards different techniques of providing the targeted content data as described further below.

Another embodiment of providing configured content data 508 to an employee is based on a new campaign that was created by an operator, or a campaign that is available for a pre-determined amount of time. That is, an employee may receive a notification (e.g., on a website, portal, or email) of the new campaign. For example, the new campaign might involve certain benefits (e.g., health, financial) within an enterprise. The new campaign may have a timeframe (e.g., a start date and an end date that may be predetermined by an operator). As such, when the employee sends a response to join the new campaign they may receive regular (e.g., daily, weekly, monthly, and/or at predetermined time intervals) updates during the time frame. The updates may include a to-do list to complete joining the campaign, or a notification if the employee did not complete enrollment.

Figure 13A:
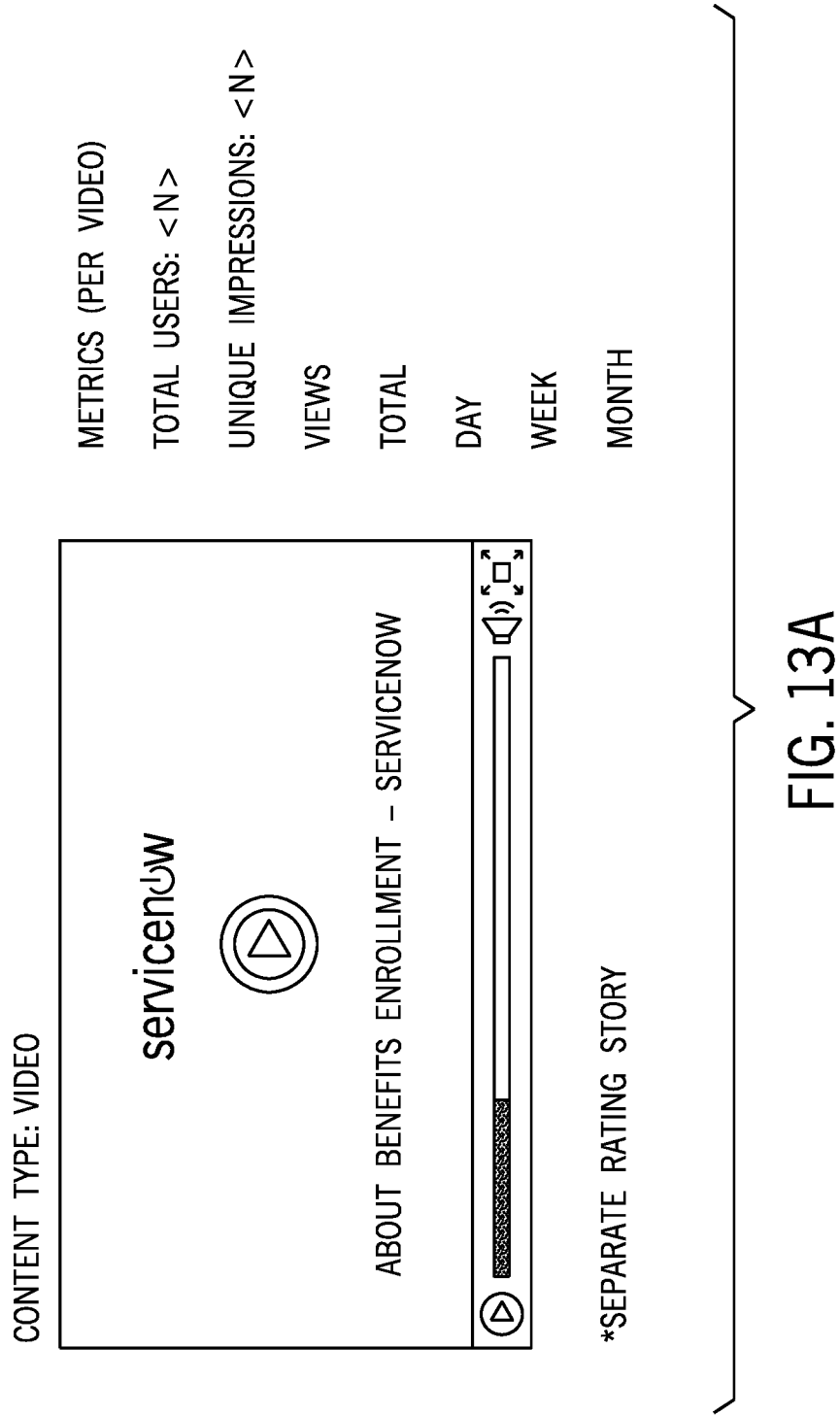
FIG. 13A is one example of displaying content data via a video, in accordance with an embodiment.
Figure 13C:
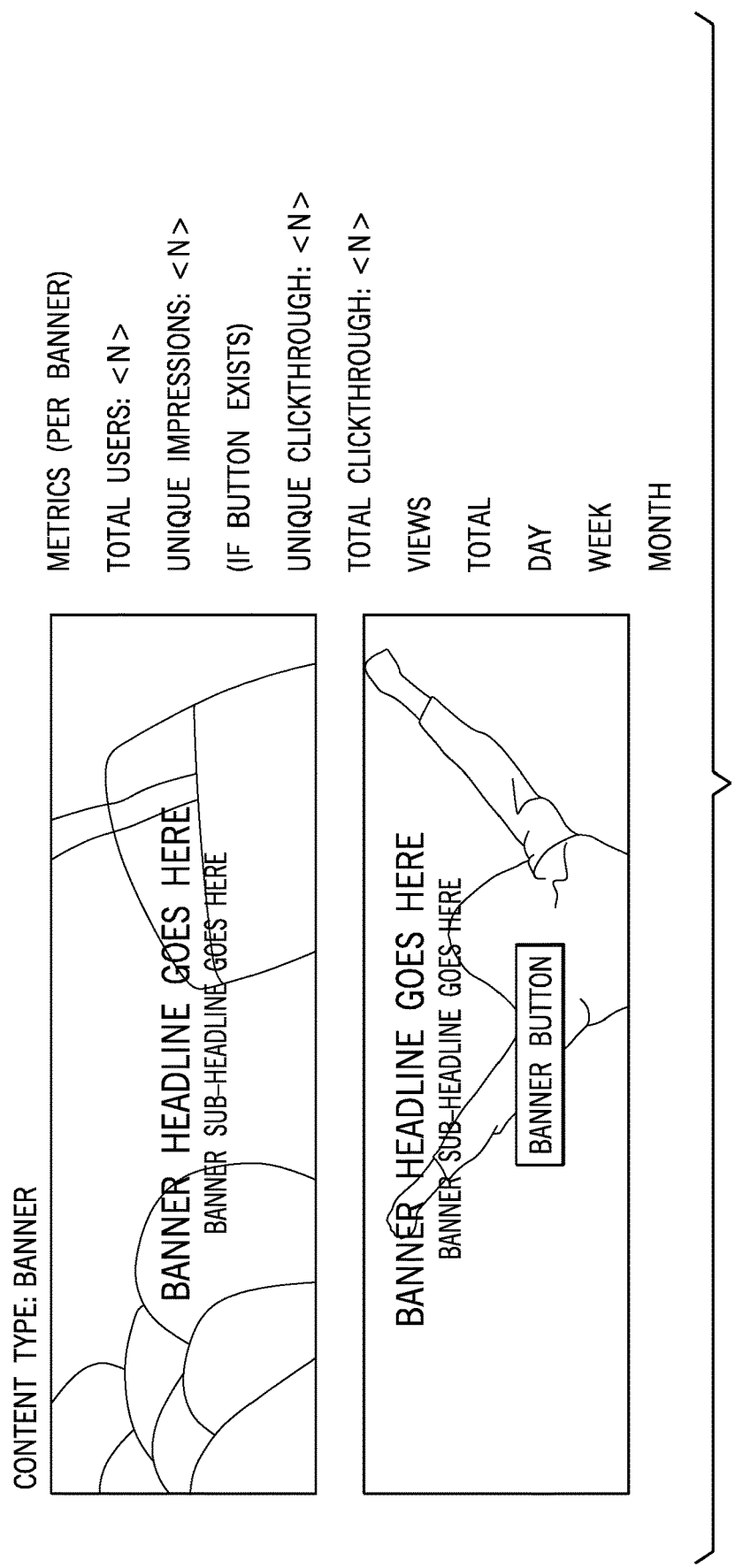
FIG. 13C is one example of displaying content data via a banner, in accordance with an embodiment.
Figure 13D:
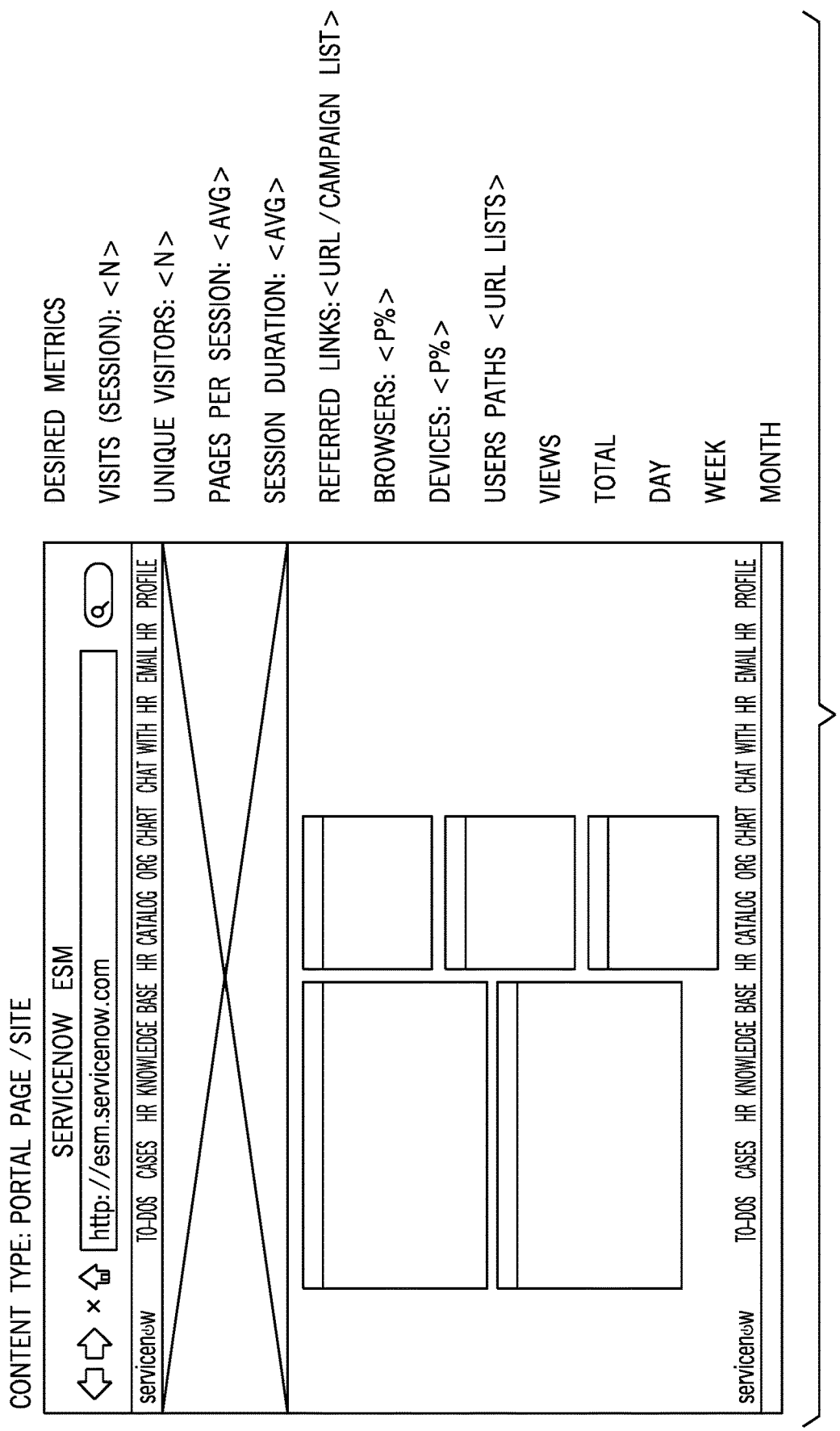
FIG. 13D is one example of displaying content data via a portal page or site, in accordance with an embodiment.
Figure 13E:
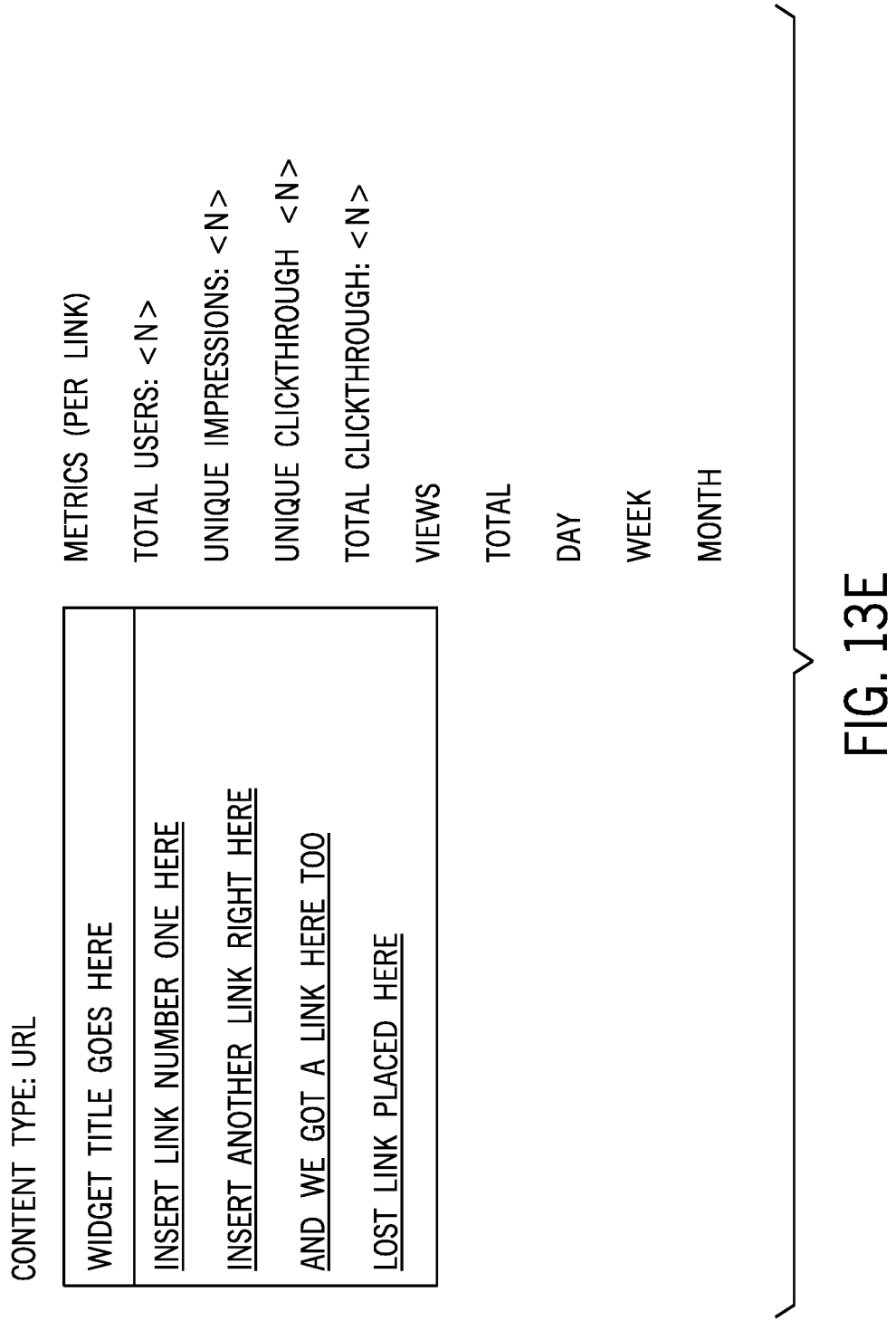
FIG. 13E is one example of displaying content data via a URL, in accordance with an embodiment.
Figure 13F:
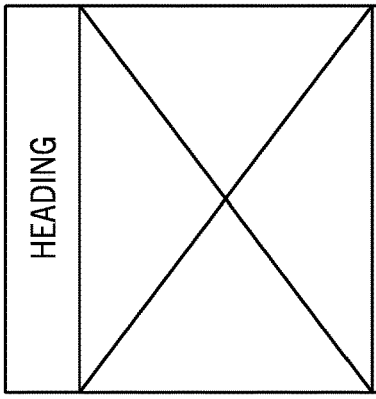
FIG. 13F is one example of displaying content data via an email, in accordance with an embodiment.

FIGS. 13A, 13B, 13C, 13D, 13E, and 13F each show various examples for sending configured content data 508 to an employee of an enterprise once they are enrolled in a campaign. Further, each figure shows different analytics for tracking how the employee interacts with the configured content data 508. FIG. 13A shows a video that may be provided via an email, on the website of the enterprise, or a portal of the enterprise, for example. The analytics for the video may include, but are not limited to, the total number of users who viewed the video, any unique impressions on the employees (e.g., number of shares, likes, comments), number of views, and how these metrics may vary over certain timeframes (e.g., days, weeks, months, years, etc.) FIG. 13B shows a calendar that may provide an employee which maps events within the campaigned they are enrolled in. In addition to some of the metrics described above, the metrics may include expand rate or total download click through. FIG. 13C shows an example of providing configured content data 508 via banners that may be displayed on a website. FIG. 13D shows a webpage that an employee may be directed to (e.g., via email) upon being enrolled in a campaign. The analytics may include the duration the employee spent on the webpage. FIG. 13E shows an example of URLs that may be provided to an employee to provide configured content data 508. FIG. 13F shows an email for providing configured content data 508 to an employee.

In another embodiment, the present disclosure relates to generating campaigns for members of an organization. The campaign may include one or more subsets of content data that a member may be made aware of upon providing trigger data. The trigger data may be a search for a key term with in the databases 44, based on how long an employee has worked for an enterprise, or how long an employee has been enrolled in a campaign. As discussed herein, the configured content data may be provided to the employee via emails, URLs, videos, calendars, banners, etc. Moreover, analytics may provide feedback indicative of the employee's interaction with the configured content data, and thus, facilitating optimization of providing configured content data to employees.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a non-transitory, machine-readable medium storing code for performing one or more operations; and
a client instance hosted by a data center, wherein the client instance is generated for one or more client networks, the system comprising a processor configured to perform the operations comprising:
receiving a request for information provided as an input by a requestor, wherein an answer to the request for information varies based on one or more characteristics of the requestor, wherein the request comprises filter data comprising one or more search terms and the one or more characteristics of the requestor, wherein the one or more characteristics of the requestor are determined automatically by the system based on an identification of the requestor, and wherein the one or more characteristics of the requestor comprise demographic information of the requestor;
identifying an initial knowledge article based upon the request;
determining that the initial knowledge article includes incorrect or outdated information;
in response to determining that the initial knowledge article includes the incorrect or outdated information, retrieving a plurality of knowledge articles from one or more databases accessible by the client instance based on the search terms, wherein each knowledge article of the plurality of knowledge articles is related to a different topic that is relevant to the request, wherein the plurality of knowledge articles each comprise a plurality of knowledge blocks, and wherein each knowledge block of the plurality of knowledge blocks of each knowledge article is tagged with metadata that identifies a relevant demographic for each knowledge block;
identifying one or more knowledge blocks of each of the plurality of knowledge articles that do not include the incorrect or outdated information and the one or more knowledge blocks are relevant to the requestor based at least in part on an overlap between the demographic information of the requestor and the metadata of the plurality of knowledge blocks;
assembling an additional knowledge article comprising the one or more identified knowledge blocks of each of the plurality of knowledge articles, wherein assembling the additional knowledge article comprises at least arranging an order of the one or more knowledge blocks of the response into the additional knowledge article configured to provide the answer that is specifically applicable to the requestor based at least in part on the demographic information of the requestor; and outputting the additional knowledge article to a client device interacting with the client instance.

2. The system of claim 1, wherein the one or more databases and one or more processor-based devices are interacting via a client instance hosted by a data center, wherein the client instance is generated for one or more client networks.

3. The system of claim 1, wherein assembling the response comprises removing one or more redundant knowledge blocks of the one or more identified knowledge blocks.

4. The system of claim 1, wherein assembling the response comprises determining the order of the one or more identified knowledge blocks based on the metadata, wherein the metadata comprises metadata prioritizing material and arranging the one or more identified knowledge blocks based on the order.

5. The system of claim 4, wherein the metadata prioritizing material conveys information related to an overlap between the one or more identified knowledge blocks.

6. The system of claim 1, wherein the plurality of knowledge articles comprise one or more of legal information, on-boarding protocol information, enterprise policy information, and human-resource information.

7. A system, comprising:
a non-transitory, machine-readable medium storing code for performing one or more operations; and
a client instance hosted by a data center, wherein the client instance is generated for one or more client networks, the system comprising a processor configured to perform the operations comprising:
receiving a request for information provided as an input by a requestor, wherein an answer to the request for information varies based on one or more characteristics of the requestor, wherein the request comprises filter data comprising one or more search terms and the one or more characteristics of the requestor, wherein the one or more characteristics of the requestor are determined automatically by the system based on an identification of the requestor, and wherein the one or more characteristics of the requestor comprise demographic information of the requestor;
identifying a first knowledge article based upon the request;
determining that the first knowledge article includes incorrect or outdated information;
in response to determining that the first knowledge article includes the incorrect or outdated information, retrieving a second knowledge article from one or more databases accessible by the client instance based on the search terms and the demographic information of the requestor, wherein the second knowledge article comprises a plurality of knowledge blocks, and wherein each knowledge block of the plurality of knowledge blocks is tagged with metadata that identifies a relevant demographic for each knowledge block;
identifying a subset of the plurality of knowledge blocks of the second knowledge article that do not include the incorrect or outdated information and are relevant to the requestor based at least in part on an overlap between the demographic information of the requestor and the metadata of the plurality of knowledge blocks;
updating the first knowledge article using the of identified subset of the plurality of knowledge blocks to generate a third knowledge article, wherein the third knowledge article comprises a single document that includes the subset of the plurality of knowledge blocks, wherein the third knowledge article is configured to provide the answer that is specifically applicable to the requestor based at least in part on the demographic information of the requestor; and
outputting the third knowledge article to a client device interacting with the client instance.

8. The system of claim 7, wherein the processor is configured to perform the operations comprising:
retrieve the characteristics of the requestor, wherein the characteristics comprise a job title or job position of an employee, wherein the subset of the plurality of knowledge blocks are identified based at least on the job title.

9. The system of claim 8, wherein the third knowledge article comprises knowledge blocks relevant to an individual having the job title.

10. The system of claim 7, wherein the characteristics of the requestor comprise data relating to a geographic location of the requestor such that the third knowledge article comprises knowledge blocks relevant to an individual at the location of the requestor.

11. The system of claim 7, wherein the characteristics of the requestor comprise data relating to a department or organization of the requestor such that the third knowledge article comprises knowledge blocks relevant to an individual associated with the department or organization of the requestor.

12. The system of claim 7, wherein the plurality of knowledge blocks include image data from a larger article.

13. The system of claim 7, wherein the request is made via a text search or query.

14. The system of claim 7, wherein the third knowledge article comprises an ordered aggregation of the subset of the plurality knowledge blocks.

15. A tangible, non-transitory, machine-readable medium, comprising machine-readable instructions, wherein the machine-readable instructions, when executed by one or more processors cause the one or more processors to:
generate a query interface as part of a graphical user interface (GUI) displayed on a client device;
receive a request for information from a requestor via the GUI, wherein an answer to the request for information varies based on one or more characteristics of the requestor, wherein the request comprises filter data comprising one or more characteristics of the requestor determined automatically based on an identity of the requestor and one or more search terms, and wherein the one or more characteristics of the requestor comprise demographic information of the requestor;
identify an initial knowledge article based upon the request;
determine that the initial knowledge article includes incorrect or outdated information;
in response to determining that the initial knowledge article includes the incorrect or outdated information, retrieve one or more knowledge articles stored in a database based on the search terms, wherein the one or more knowledge articles comprise one or more of legal information, on-boarding protocol information, enterprise policy information, and human-resource information, and wherein each knowledge article of the one or more the knowledge articles comprises a first subset of knowledge blocks that do not include the incorrect or outdated information and the one or more knowledge blocks wherein each knowledge block of the first subset of knowledge blocks is tagged with metadata that identifies a relevant demographic for each knowledge block;

generate an additional knowledge article by removing one or more portions of the initial article that include the incorrect or outdated information and incorporating the first subset of knowledge blocks that do not include the incorrect or outdated information of each knowledge article of the one or more knowledge articles that are relevant to the requestor, wherein the knowledge article is a single document configured to provide the answer that is specifically applicable to the requestor based at least in part on the demographic information of the requestor; and output the additional knowledge article to the client device.

16. The tangible, non-transitory, machine-readable medium of claim 15, wherein the additional knowledge article is dynamically assembled based on the one or more search terms.

17. The tangible, non-transitory, machine-readable medium of claim 16, wherein the additional knowledge article is updated based on one or more subsequently entered search terms.

18. The tangible, non-transitory, machine-readable medium of claim 15, wherein the response is assembled based at least in part on relevancy between the filter data and the first subset of knowledge blocks.

19. The tangible, non-transitory, machine-readable medium of claim 15, wherein the response is a browser-accessible document that comprises the first subset of knowledge blocks.

20. The tangible, non-transitory, machine-readable medium of claim 15, wherein the machine-readable instructions, when executed by one or more processors cause the one or more processors to:

receive a subsequent request for information from a subsequent requestor via the GUI, wherein the subsequent request comprises filter data comprising one or more characteristics of the subsequent requestor determined automatically based on an identity of the subsequent requestor and one or more search terms input by the subsequent requestor, and wherein the one or more characteristics of the subsequent requestor comprise demographic information of the subsequent requestor; and determining the additional knowledge article is relevant to the subsequent requestor based on the one or more search terms and the one or more characteristics of the subsequent requestor; and outputting the additional knowledge article to an additional client device associated with the subsequent requestor.

* * * * *